US012768293B2

(12) United States Patent
Svraka et al.

(10) Patent No.: US 12,768,293 B2
(45) Date of Patent: Oct. 20, 2026

(54) AMMONIA SLIP CATALYST DEVICE AND UREA INJECTION CONTROL METHOD

(71) Applicant: Volvo Truck Corporation, Gothenburg (SE)

(72) Inventors: Irman Svraka, Gothenburg (SE); Björn Henriksson, Gothenburg (SE); Dan Stenqvist, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 19/055,025

(22) Filed: Feb. 17, 2025

(65) Prior Publication Data

US 2025/0270948 A1 Aug. 28, 2025

(30) Foreign Application Priority Data

Feb. 27, 2024 (EP) .................................... 24159872

(51) Int. Cl.
*F01N 3/20* (2006.01)
*F01N 3/28* (2006.01)
*F01N 13/00* (2010.01)

(52) U.S. Cl.
CPC ........... *F01N 3/208* (2013.01); *F01N 3/2066* (2013.01); *F01N 3/28* (2013.01); *F01N 13/008* (2013.01);
(Continued)

(58) Field of Classification Search
CPC ...... F01N 3/208; F01N 13/009; F01N 3/2066; F01N 3/2073; F01N 2560/021
See application file for complete search history.

(56) References Cited

U.S. PATENT DOCUMENTS 5,709,081 A * 1/1998 Bruestle ............. B01D 53/9495 60/284
2009/0272102 A1* 11/2009 Ofoli ....................... F01N 3/103 60/299
(Continued)

FOREIGN PATENT DOCUMENTS

DE 3930380 A1 * 3/1991 ............... F02D 9/04
FR 3054600 A1 * 2/2018 ............ F01N 3/208
(Continued)

OTHER PUBLICATIONS

Extended European Search Report for European Patent Application No. 24159872.1, mailed May 15, 2024, 9 pages.

*Primary Examiner* — Laert Dounis
(74) *Attorney, Agent, or Firm* — Withrow & Terranova, PLLC

(57) ABSTRACT

An ammonia slip catalyst device for arrangement downstream of a catalytic reduction device in a vehicle exhaust aftertreatment system, the ammonia slip catalyst device comprises: an inlet for receiving exhaust gas from a catalytic reduction device, and an outlet for directing outlet gas towards an exhaust outlet of the exhaust aftertreatment system, a flow direction of the ammonia slip catalyst device being from the inlet to the outlet, an active region having an inlet and an outlet, the active region comprising a catalyst coating that is configured to reduce an amount of ammonia in the received exhaust gas by oxidation, and an inactive region having an inlet and an outlet, the inactive region being without catalyst coating, whereby the inactive region is configured to allow ammonia in the received exhaust gas to pass.

16 Claims, 5 Drawing Sheets

(52) U.S. Cl.
CPC ...... *F01N 13/009* (2014.06); *F01N 2510/068* (2013.01); *F01N 2560/021* (2013.01); *F01N 2610/02* (2013.01); *F01N 2900/1616* (2013.01); *Y02T 10/12* (2013.01)

(56) References Cited

U.S. PATENT DOCUMENTS

2021/0231039 A1 7/2021 Piche et al.
2022/0056830 A1* 2/2022 Smits .................... F01N 13/009

FOREIGN PATENT DOCUMENTS

SE 1000465 A1 * 5/2010 .............. F01N 11/00
WO 2010068147 A1 6/2010
WO 2020236065 A1 11/2020

* cited by examiner

AMMONIA SLIP CATALYST DEVICE AND UREA INJECTION CONTROL METHOD

PRIORITY APPLICATIONS

The present application claims priority to European Patent Application No. 24159872.1, filed on Feb. 27, 2024, and entitled "AMMONIA SLIP CATALYST DEVICE AND UREA INJECTION CONTROL METHOD," which is incorporated herein by reference in its entirety.

TECHNICAL FIELD

The disclosure relates generally to exhaust aftertreatment systems of vehicles. In particular aspects, the disclosure relates to an ammonia slip catalyst device and urea injection control method. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Aftertreatment systems in vehicles comprises catalytic devices such as selective catalyst reduction, SCR, devices that serve to reduce the NOx emissions from the vehicles by controlled injection of ammonia, NH3. Too low NH3 values in the SCR device may imply unwanted NOx-emissions, whilst too high NH3 emissions in the SCR device lead to NH3 in the ammonia slip catalyst, which may cause unwanted NH3 or N2O in the exhaust aftertreatment system outlet tailpipe. Thus, it is desirable to improve the control of the amount of NH3 upstream of the ammonia slip catalyst.

SUMMARY

According to a first aspect of the disclosure, there is provided an ammonia slip catalyst device for arrangement downstream of a catalytic reduction device in a vehicle exhaust aftertreatment system, the ammonia slip catalyst device comprises: an inlet for receiving exhaust gas from a catalytic reduction device, and an outlet for directing outlet gas towards an exhaust outlet of the exhaust aftertreatment system, a flow direction of the ammonia slip catalyst device being from the inlet to the outlet, an active region having an inlet and an outlet, the active region comprising a catalyst coating that is configured to reduce an amount of ammonia in the received exhaust gas by oxidation, and an inactive region having an inlet and an outlet, the inactive region being without catalyst coating, whereby the inactive region is configured to allow ammonia in the received exhaust gas to pass.

The first aspect of the disclosure may seek to provide an ammonia slip catalyst device that allow for measuring the upstream amount of ammonia slip in a downstream position of the ammonia slip catalyst device. That is, more accurate measurements of the ammonia slip out from the catalytic reduction device is made possible by the ammonia slip catalyst device which has the inactive region thereby allowing some exhaust gas to slip through the ammonia slip catalyst device. This allows for measuring a part, e.g., a small part, of exhaust gas downstream of the ammonia slip catalyst device that reflects the composition of the exhaust gas upstream of the ammonia slip catalyst device. That is, the ammonia can hereby be measured instead of being modelled as is often the case in prior solutions. A technical benefit may include improved control of the amount of NH3 upstream of the ammonia slip catalyst.

A sensor may be arranged at the outlet of the ammonia slip catalyst. The sensor is configured to measure a level of ammonia in the exhaust gas at the outlet. The level or concentration of ammonia upstream of the ammonia slip catalyst device may be calculated based on the measured level of ammonia and on a ration between coated parts in the active region and uncoated parts in the inactive region. The calculation may be a scaling of the measured level of ammonia by the ratio.

The amount or level of ammonia refer to a concentration or mass-flow of ammonia, e.g., measured in ppm or grams/second.

Optionally in some examples, including in at least one preferred example, the ammonia slip catalyst device may comprise a sensor arranged at an outlet of the inactive region, the sensor being configured to measure a level of ammonia in the exhaust gas at the outlet of the inactive region. Measuring the level of ammonia in the exhaust gas at the outlet of the inactive region provides improved readings of the ammonia possibly without the need of knowing the area of the inactive region in relation to the total area of the coated and uncoated parts of the ammonia slip catalyst device.

Optionally in some examples, including in at least one preferred example, the inactive region may be surrounded by the active region. That is, the inactive region forms a tunnel through the active region, providing one advantageous implementation.

Optionally in some examples, including in at least one preferred example, the inlets of the active region and the inactive region may be sub-portions of the inlet of the ammonia slip catalyst device. A technical benefit may include relatively simple manufacturing and installation of the ammonia slip catalyst device with only a single inlet and a single outlet.

Optionally in some examples, including in at least one preferred example, the inactive region and the active regions may be concentric. Since the exhaust gas flows relatively straight through the ammonia slip catalyst device, having the regions concentric provides for more reliable estimation of the upstream ammonia levels from measurements downstream of the ammonia slip catalyst device. This is because it can be assumed that exhaust gas that exits at the outlet of the inactive regions has passed through only the inactive region of the ammonia slip catalyst device.

Optionally in some examples, including in at least one preferred example, wherein the area of non-coated surfaces in the inactive region is less than 5% of the total area of surfaces in the active and non-active regions. A technical benefit may include that the ammonia slip catalyst device is still efficient in oxidizing the ammonia that slips from the catalytic reduction device. In other examples, the non-coated area corresponds to about 4%, 3%, 2%, or 1% of the of the total area of surfaces in the active and non-active regions.

Optionally in some examples, including in at least one preferred example, the ammonia slip catalyst device may further comprise a bypass pipe comprising the inactive region, the bypass pipe being separated from the active region. A technical benefit may include that the active region of the ammonia slip catalyst device may be maintained. That is, the bypass pipe may be provided as an add-on to an existing ammonia catalyst slip device that may only need minimum modifications.

Optionally in some examples, including in at least one preferred example, the bypass pipe and the active region may be eccentric. A technical benefit may include that the bypass pipe is arranged outside the active region of the ammonia slip catalyst device.

There is further provided an exhaust aftertreatment system for a vehicle comprising: a catalytic reduction device, at least one urea injector upstream of the catalytic reduction device, and an ammonia slip catalyst device according to anyone of the preceding examples.

Optionally in some examples, including in at least one preferred example, the exhaust aftertreatment system may further comprise a sensor arranged at an outlet of the ammonia slip catalyst device, the sensor being configured to measure a level of ammonia in the exhaust gas at the outlet of the ammonia slip catalyst device; and a processing circuitry configured to: calculate the levels of ammonia in the exhaust gas at the inlet of the ammonia slip catalyst device based on the measured levels of ammonia and on the ratio of coated area in the active-region and non-coated area in the inactive region of the ammonia slip catalyst device, and control the urea injector to adjust an amount of urea based on the calculated levels of ammonia in the exhaust gas at the inlet of the ammonia slip catalyst device to reduce the amount of urea at the inlet of the ammonia slip catalyst device. A technical benefit may include improved readings or estimations of ammonia upstream of the ammonia slip catalyst device such that the dosage of urea can be better controlled. Advantageously, this leads to reduced emissions.

Optionally in some examples, including in at least one preferred example, the exhaust aftertreatment system may further comprise a sensor arranged at an outlet of the inactive region of the ammonia slip catalyst device, the sensor being configured to measure a level of ammonia in the exhaust gas at the outlet of the inactive region of the ammonia slip catalyst device; and a processing circuitry configured to: determine the levels of ammonia in the exhaust gas at the inlet of the ammonia slip catalyst device based on the measured levels of ammonia, and control the urea injector to adjust an amount of urea based on the determined levels of ammonia in the exhaust gas at the inlet of the ammonia slip catalyst device to reduce the amount of urea at the inlet of the ammonia slip catalyst device. A technical benefit may include improved readings or estimations of ammonia upstream of the ammonia slip catalyst device, without knowledge of the ratio between the inactive regions area and the active regions area, such that the dosage of urea can be better controlled. Advantageously, this leads to reduced emissions.

There is further provided a vehicle comprising the ammonia slip catalyst device and/or the exhaust aftertreatment system.

According to a second aspect of the disclosure, there is provided a method for controlling the amount of urea or ammonia injected into an engine exhaust gas flow upstream of a catalytic reduction device, comprising: measuring an amount of ammonia at an outlet of an ammonia slip catalyst device arranged downstream of the catalytic reduction device to receive exhaust gas from the catalytic reduction device, the ammonia slip catalyst device comprises an active region having an inlet and an outlet and comprising a catalyst coating that is configured to reduce an amount of ammonia in received exhaust gas by oxidation, and the inactive region having an inlet and an outlet, the inactive regions being without catalyst coating, whereby the inactive region is configured to allow ammonia in the received exhaust gas to pass, determining the levels of ammonia in the exhaust gas at the inlet of the ammonia slip catalyst device based on the measured levels of ammonia, controlling a urea injector to adjust an amount of urea or ammonia upstream of the catalytic reduction device based on the calculated levels of ammonia in the exhaust gas at the inlet of the ammonia slip catalyst device to reduce the amount of urea at the inlet of the ammonia slip catalyst device.

The second aspect of the disclosure may seek to provide more accurate estimation of the amount of ammonia slip upstream of the ammonia slip catalyst device, to thereby provide more efficient dosage of urea injection. A technical benefit may thus include improved control of the amount of ammonia upstream of the ammonia slip catalyst and reduced emissions of ammonia and nitride oxides.

Optionally in some examples, including in at least one preferred example, the sensor is arranged to measure a combined amount of ammonia at an outlet of the inactive region and the active region, determining the levels of ammonia in the exhaust gas at the inlet of the ammonia slip catalyst device is based on the measured levels of ammonia, and on the ratio of coated area in the active-region and non-coated area in the inactive region of the ammonia slip catalyst device. A technical benefit may include further improved control of the amount of NH3 upstream of the ammonia slip catalyst and reduced emissions.

Optionally in some examples, including in at least one preferred example, the sensor is arranged to measure the amount of ammonia at the outlet of the inactive region, determining the levels of ammonia in the exhaust gas at the inlet of the ammonia slip catalyst device is based on the measured levels of ammonia. A technical benefit may include improved readings or estimations of ammonia upstream of the ammonia slip catalyst device, without knowledge of the ratio between the inactive regions area and the active regions area, such that the dosage of urea can be better controlled. Advantageously, this leads to reduced emissions.

Optionally in some examples, including in at least one preferred example, the inactive region may be surrounded by the active region. That is, the inactive region forms a tunnel through the active region, providing one advantageous implementation.

Optionally in some examples, including in at least one preferred example, the area of non-coated surfaces in the inactive region is less than 5% of the total area of surfaces in the active and non-active regions. A technical benefit may include that the ammonia slip catalyst device is still efficient in oxidizing the ammonia that slips from the catalytic reduction device.

Optionally in some examples, including in at least one preferred example, the inactive region may be in a bypass pipe being separated from the active region. A technical benefit may include that the active region of the ammonia slip catalyst device may be maintained. That is, the bypass pipe may be provided as an add on to an existing ammonia slip catalyst device that may only need minimum modifications.

Optionally in some examples, including in at least one preferred example, the bypass pipe and the active region may be eccentric. A technical benefit may include that the bypass pipe is arranged outside the active region of the ammonia slip catalyst device.

Optionally in some examples, including in at least one preferred example, the method may be performed on-board a vehicle.

There is further provided a processing circuitry configured to execute the steps of the method.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The efficiency of exhaust aftertreatment systems in vehicles rely at least partly on correct dosing of a reductant, for example urea, in catalytic reduction device such as selective catalytic reduction, SCR, devices to minimize the emissions of nitrogen oxides, NOx. A too low dosing of urea results in too high emissions of NOx. To the contrary, too high dosing of urea leads to ammonia, NH3, slip, that may lead to NH3 or N2O in the exhaust aftertreatment system out tailpipe. An ammonia slip catalyst, often denoted ACS, is arranged to handle ammonia slip, but even so, too high levels of ammonia slip is undesirable and may even be unmanageable by the ammonia slip catalyst and thus still lead to NH3 or N2O emissions. Although many systems are efficient in handling ammonia slip, the inventors have identified further improvements that are herein described.

Figure 1:
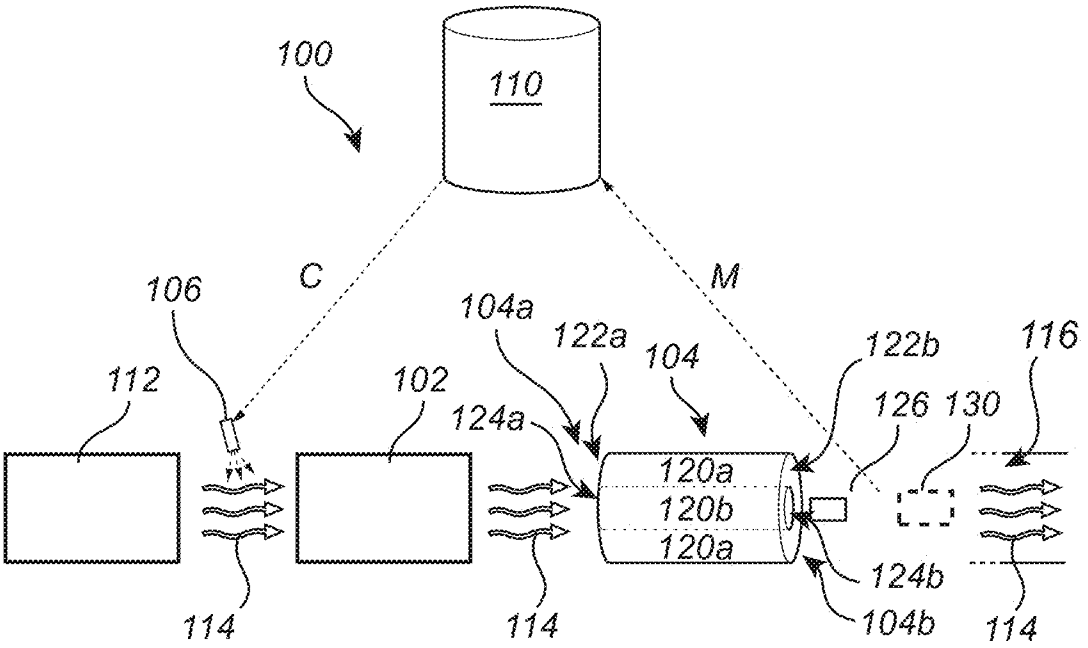
FIG. 1 is an exemplary exhaust gas aftertreatment system according to an example.

FIG. 1 is a diagram of an exemplary exhaust aftertreatment system 100 according to an example. The exhaust aftertreatment system 100 comprises a catalytic reduction device 102 arranged upstream of an ammonia slip catalyst device 104. At least one urea injector 106 is arranged upstream of the catalytic reduction device 102.

A catalytic reduction device is generally a device able to reduce the level of nitrogen oxides in exhaust aftertreatment systems of vehicles using a catalyst and a reductant typically being ammonia or urea that is added to the exhaust gas flow. Various types of catalytic reduction devices are per se known and are conceivable options for examples herein, and some examples are selective catalytic reduction (SCR) devices, lean nitrogen oxide traps, hydrogen-carbon selective catalytic reduction devices and a selective catalytic reduction-coated diesel particulate filter. Herein, the preferred catalytic reduction device is the selective catalytic reduction device, often denoted SCR.

Urea or ammonia is injected by the injector 106 at a flow rate upstream of the catalytic reduction device 102. For this, the injector 106 is controlled by means of a control signal, C, generated by the processing circuitry 110. The injector 106 is responsive to the control signal, C, to inject urea or ammonia based on information in the control signal, C, for example related to a desired flow rate of urea or ammonia.

The catalytic reduction device 102 receives exhaust gas 114 from a combustion engine 112. The injector 106 injects the reductant that is mixed with the exhaust gas 114 in the catalytic reduction device 102. Excess ammonia downstream of the catalytic reduction device 102, also called ammonia slip, is received in the ammonia slip catalyst device 104 along with the outlet exhaust gas 114 from the catalytic reduction device 102.

The ammonia slip catalyst device 104 comprises an inlet 104*a* for receiving exhaust gas from the catalytic reduction device 102 and an outlet 104*b* for directing outlet gas towards an exhaust outlet 116 of the exhaust aftertreatment system 100. A flow direction of the ammonia slip catalyst device 104 is from the inlet 104*a* to the outlet 104*b*.

The ammonia slip catalyst device 104 comprises an active region 120*a* having an inlet 122*a* and an outlet 122*b*. The active region comprising a catalyst coating that is configured to reduce an amount of ammonia in the received exhaust gas by oxidation. The mechanical structure of the ammonia slip catalyst devices is considered known and will not be described in detail herein. However, for reference, an ammonia slip catalyst device typically includes an array of pipes to increase the surface area that the exhaust gas comes in contact with inside the device. The surfaces that are considered active are coated with a catalytic coating, such as for example Cu-zeolite, although other coatings may be applicable.

The ammonia slip catalyst device 104 further comprises an inactive region 120*b* having an inlet 124*a* and an outlet 124*b*. The inactive region 120*b* being without catalyst coating, whereby the inactive region is configured to allow ammonia in the received exhaust gas 114 to pass to the outlet 124*b*. In other words, no or very little ammonia oxidation occurs in the inactive region 120*b*.

The inactive region 120*b* and the active region 120*a* are housed in a common casing.

A sensor 126 configured to measure a level of ammonia in the exhaust gas is arranged at the outlet of the ammonia slip catalyst device 104. The sensor 126 may be arranged directly at the outlet 124*b* of the inactive region 120*b* to measure a level of ammonia in the exhaust gas at the outlet 124*b* of the inactive region 120*b*. In this case, the measured level of ammonia closely resembles the levels directly upstream of the ammonia slip catalyst device 104 since the measured gas has passed through the inactive region 120*b*. The processing circuitry 110 which receives measurements messages, M, from the sensor 126 is configured to determine the levels of ammonia in the exhaust gas 114 at the inlet 104*a* of the ammonia slip catalyst device 104 based on the measured levels of ammonia. In this case, the measured levels can be assumed to be same as the levels to be determined, upstream of the ammonia slip catalyst device 104. The processing circuitry 110 control the urea injector 106 to adjust an amount of urea based on the determined levels of ammonia in the exhaust gas at the inlet of the ammonia slip catalyst device 104, that is, the measured levels downstream of the inactive region 120*b*, to reduce the amount of urea at the inlet of the ammonia slip catalyst device 106.

The sensor may a so-called "NOx-sensor" which is commonly employed in the technical filed and which can measure both ammonia and NOx. However, a sensor that can measure only ammonia is also applicable and are considered known in the technical field of exhaust aftertreatment systems. That is, the sensor 126 may be of the type that measures both ammonia and NOx, or a sensor that measure only ammonia.

Due to space constraints, it is difficult and inconvenient to mount an ammonia slip sensor upstream of the ammonia slip catalyst device 104. The sensor 126 is therefore advantageous arranged downstream of the ammonia slip catalyst device 104. In the above-described example, the sensor 126 is arranged just at the outlet 124*b* of the inactive region 120*b* such that the measured gas has substantially the same concentration of ammonia as at the inlet 124*a* since the inactive region 120 does not oxidize the ammonia by its lack of catalyst coating. Thus, no calculations or estimation are needed for determining the level of ammonia at the inlet of the ammonia slip catalyst device 104, downstream of the SCR 102.

In alternative examples, the sensor 130 is arranged slightly downstream of the outlet 104*b* of the ammonia slip catalyst device 104. In this way, the sensor 130 is arranged to measure a combined amount of ammonia at the outlets 122*b*, 124*b*, of the inactive region 120*b* and the active region 120*a*, that is, the combined amount of ammonia at the outlet 104*b* of the ammonia slip catalyst device 104.

The processing circuitry 110 is then configured to calculate the levels of ammonia in the exhaust gas at the inlet 104*a* of the ammonia slip catalyst device 104 based on the measured levels of ammonia and on the ratio of coated area in the active region 120*a* and non-coated area in the inactive region 120*b* of the ammonia slip catalyst device 104. That is, the processing circuitry 110 has prior knowledge, or data, stored that indicates the ratio. Scaling the measured levels of ammonia by the ratio, for example by multiplying the ratio with the measured levels, the processing circuitry 110 calculates the level of ammonia in the exhaust gas directly upstream of the ammonia slip catalyst device 104, and downstream of the SCR 102.

The processing circuitry 110 controls the urea injector 106 to adjust an amount of urea based on the calculated levels of ammonia in the exhaust gas 114 at the inlet 104*a* of the ammonia slip catalyst device 106 to reduce the amount of urea at the inlet 104*a* of the ammonia slip catalyst device 106, thus downstream of the SCR 102.

Preferably, the processing circuitry 110 executes the calculations and control on-board the vehicle.

Figure 2A:
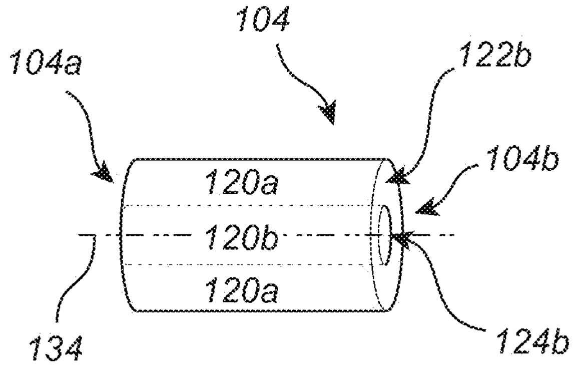
FIG. 2A-2B are two schematic views of an example ammonia slip catalyst device.
Figure 2B:
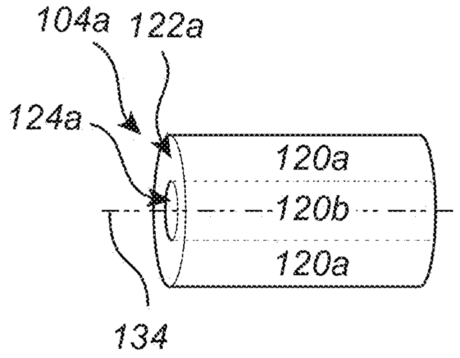

FIGS. 2A-2B schematically illustrate the ammonia slip catalyst device 104 from two different angles. In this example, the inactive region 120*b* is surrounded by the active region 120*a*. That is, the inactive region 120*b* forms a tunnel or channel through the active region 120*a*. The inactive region 120*b* is in this way integrated in the active region 120*a* which makes for a compact ammonia slip catalyst device 104.

Furthermore, the inactive region 120*b* and the active region 120*a* are concentric and thus share the same longitudinal axis 134 aligned with the flow direction of exhaust gas from the inlet 104*a* to the outlet 104*b* of the ammonia slip catalyst device 104. The shape of the inactive region 120*b* through the ammonia slip catalyst device 104 may be the same from the inlet 104*a* to the outlet 104*b*. This facilitates calculating the level of ammonia in the exhaust gas directly upstream of the ammonia slip catalyst device 104 since the area of the regions may even refer to the area of the outlets 122*b* and 124*b*. That is, the ratio used in the calculation may be the ratio between the area 124*b* and total area of the outlet 104*b*.

The ammonia slip catalyst device 104 and its active 120*a* and inactive region 120*b* are here shown as being cylindrical. However, note that this is only to exemplify a possible implementation and other shapes are also envisaged and within the scope of the disclosure.

The area of non-coated surfaces in the inactive region is less than 5% of the total area of surfaces in the active 120*a* and inactive 120*b* regions. In other examples, the non-coated area corresponds to about 1% of the full area. Thus, it may be assumed that 99% of the incoming NH3 has been exposed to coated ASC area. The processing circuit may thus back calculate the amount of NH3 that has slipped from the SCR 102 to the ASC 104 whilst keeping emission values at a minimum by controlling the urea injection.

In this example, shown in FIGS. 2A-2B, the inlet 122*a* of the active region 120*a* and the inlet 124*a* of the inactive region 120*b* are sub-portions of the inlet 104*a* of the ammonia slip catalyst device 104. That is, in this integrated example of ammonia slip catalyst device 104, the inlet 104*a* of the ammonia slip catalyst device 104 is shared between the active region 120*a* and the inactive region 120*b*. In a similar way, the outlet 122*b* of the active region and the outlet 124*b* of the inactive region are sub-portions of the outlet 104*b* of the ammonia slip catalyst device 104. That is, in this integrated example of ammonia slip catalyst device 104, the outlet 104*b* of the ammonia slip catalyst device 104 is shared between the active region 120*a* and the inactive region 120*b*.

Figure 2C:
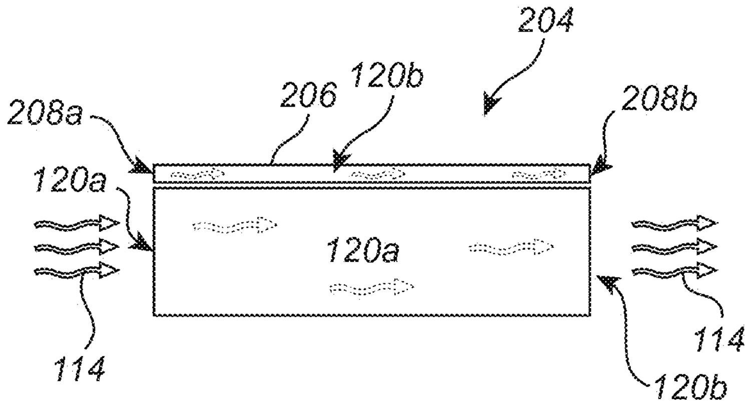
FIG. 2C schematically illustrates an example ammonia slip catalyst device.

FIG. 2C is a schematically illustrates ammonia slip catalyst device 204 according to another example. Here, the active region 120*a* is separated from the inactive region 120*b*. The inlet 104*a* of the ammonia slip catalyst device 204 belongs to the active region 120*a* and the inactive region 120*b* is arranged in a bypass pipe 206. The bypass pipe 206 is arranged outside the active region 120*a* and thus has a dedicated inlet 208*a* and outlet 208*b* separate from the inlet 120*a* and 120*b* of the active region 120*a*.

The bypass pipe 206 and the active region 120*a* are eccentric, equally termed nonconcentric, thus they do not share the same longitudinal axis.

A sensor for measuring the levels of ammonia may be placed directly at the outlet 208*b* of the bypass pipe 206.

Figure 3:
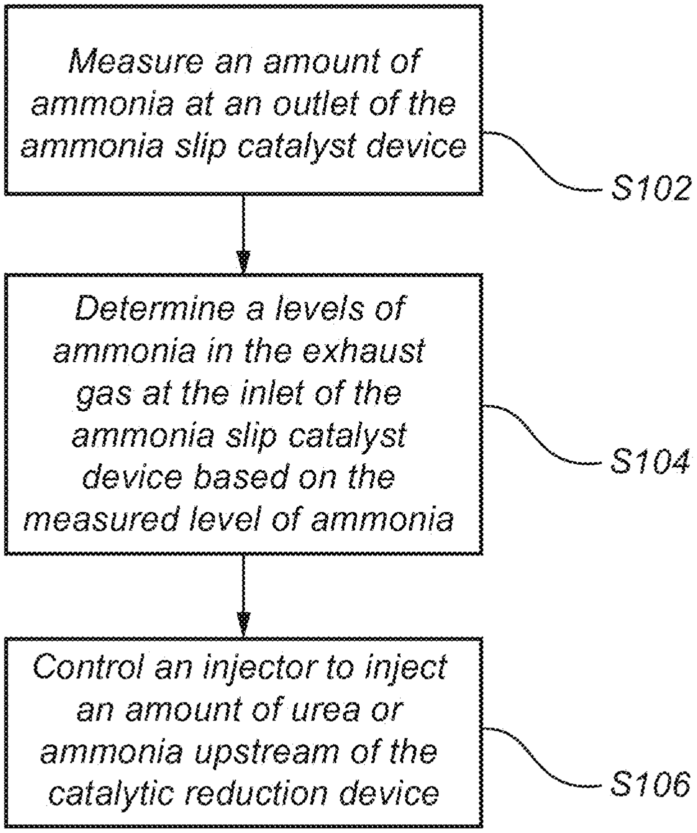
FIG. 3 is a flow-chart of method steps for controlling the amount of urea or ammonia injected into an engine exhaust gas flow upstream of a catalytic reduction device according to an example.

FIG. 3 is a flow-chart of method steps for controlling the amount of urea or ammonia injected into an engine exhaust gas flow upstream of a catalytic reduction device according to examples.

In step S102, measuring an amount of ammonia at an outlet of an ammonia slip catalyst device arranged downstream of the catalytic reduction device to receive exhaust gas from the catalytic reduction device. The ammonia slip catalyst device comprises an active region having an inlet and an outlet and comprising a catalyst coating that is configured to reduce an amount of ammonia in received exhaust gas by oxidation, the inactive region having an inlet and an outlet. The inactive regions lack catalyst coating, whereby the inactive region is configured to allow ammonia in the received exhaust gas to pass.

In step S104, determining the levels of ammonia in the exhaust gas at the inlet of the ammonia slip catalyst device based on the measured levels of ammonia.

In step S106, controlling an injector to adjust an amount of urea or ammonia upstream of the catalytic reduction device based on the calculated levels of ammonia in the exhaust gas at the inlet of the ammonia slip catalyst device to reduce the amount of urea at the inlet of the ammonia slip catalyst device.

As discussed above, in some examples, the sensor is arranged to measure a combined amount of ammonia at an outlet of the inactive region and the active region. In this case, determining, S104, the levels of ammonia in the exhaust gas at the inlet of the ammonia slip catalyst device is based on the measured levels of ammonia, and on the ratio of coated area in the active-region and non-coated area in the inactive region of the ammonia slip catalyst device.

In some examples, the sensor is arranged to measure the amount of ammonia at the outlet of the inactive region. In this case determining, S104, the levels of ammonia in the exhaust gas at the inlet of the ammonia slip catalyst device is based on the measured levels of ammonia.

Figure 4:
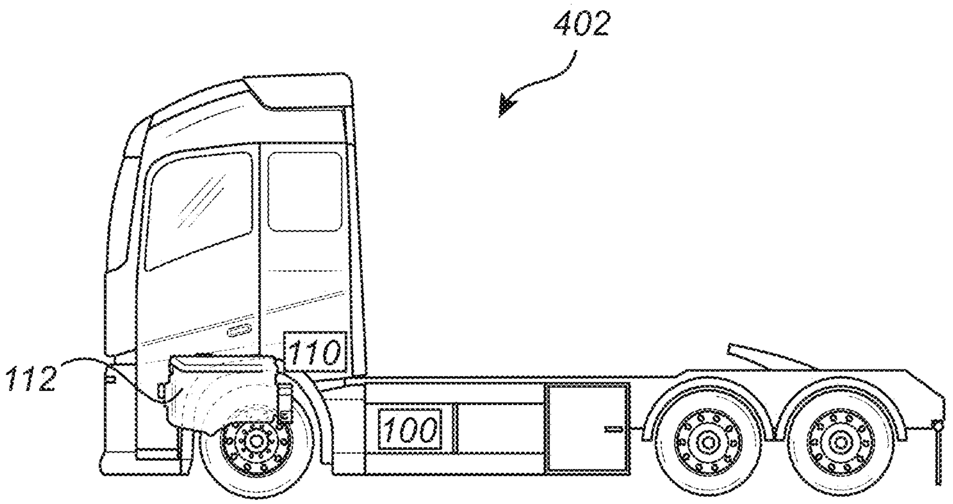
FIG. 4 is a truck according to an example vehicle.

FIG. 4 illustrates a vehicle in the form of a truck 402 comprising an engine 112 such as an internal combustion engine, for example a diesel engine. The truck 402 further comprises a processing circuitry 110 and an exhaust gas aftertreatment system 100 including a catalytic reduction device, at least one urea injector upstream of the catalytic reduction device, and an ammonia slip catalyst device, as described herein. Further, the exhaust gas aftertreatment system 100 may include e.g. multiple urea injectors, particulate filters, and nitride oxide sensors.

Figure 5:
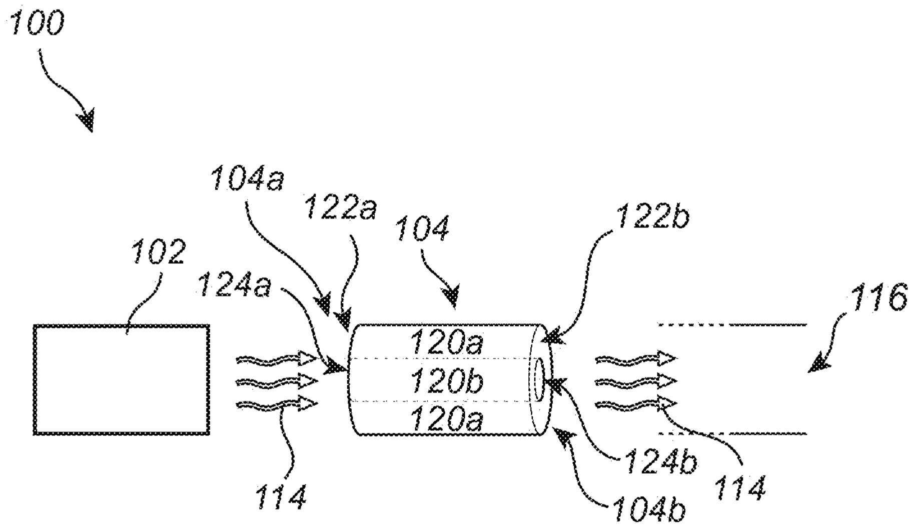
FIG. 5 is another view of FIG. 1, according to an example.

FIG. 5 is another view of FIG. 1, according to an example. FIG. 5 illustrates an ammonia slip catalyst device 104 for arrangement downstream of a catalytic reduction device 102 in a vehicle exhaust aftertreatment system 100, the ammonia slip catalyst device 104 comprises: an inlet 104*a* for receiving exhaust gas 114 from a catalytic reduction device 102, and an outlet 104*b* for directing outlet gas towards an exhaust outlet 116 of the exhaust aftertreatment system 100, a flow direction of the ammonia slip catalyst device being from the inlet 104*a* to the outlet 104*b*, an active region 120*a* having an inlet 122*a* and an outlet 122*b*, the active region 120*a* comprising a catalyst coating that is configured to reduce an amount of ammonia in the received exhaust gas by oxidation, and an inactive region 120*b* having an inlet 124*a* and an outlet 124*b*, the inactive region 120*b* being without catalyst coating, whereby the inactive region 120*b* is configured to allow ammonia in the received exhaust gas to pass.

Example 1: An ammonia slip catalyst device for arrangement downstream of a catalytic reduction device in a vehicle exhaust aftertreatment system, the ammonia slip catalyst device comprises: an inlet for receiving exhaust gas from a catalytic reduction device, and an outlet for directing outlet gas towards an exhaust outlet of the exhaust aftertreatment system, a flow direction of the ammonia slip catalyst device being from the inlet to the outlet, an active region having an inlet and an outlet, the active region comprising a catalyst coating that is configured to reduce an amount of ammonia in the received exhaust gas by oxidation, and an inactive region having an inlet and an outlet, the inactive region being without catalyst coating, whereby the inactive region is configured to allow ammonia in the received exhaust gas to pass.

Example 2: The ammonia slip catalyst device of example 1, further comprising: a sensor arranged at an outlet of the inactive region, the sensor being configured to measure a level of ammonia in the exhaust gas at the outlet of the inactive region.

Example 3: The ammonia slip catalyst device of any of examples 1-2, wherein the inactive region is surrounded by the active region.

Example 4: The ammonia slip catalyst device of example 3, wherein the inlets of the active region and the inactive region are sub-portions of the inlet of the ammonia slip catalyst device.

Example 5: The ammonia slip catalyst device of any of examples 3-4, wherein the outlets of the active region and the inactive region are sub-portions of the outlet of the ammonia slip catalyst device.

Example 6: The ammonia slip catalyst device of any of examples 1-5, wherein the inactive region and the active regions are concentric.

Example 7: The ammonia slip catalyst device of any of examples 1-6, wherein the area of non-coated surfaces in the inactive region is less than 5% of the total area of surfaces in the active and non-active regions.

Example 8: The ammonia slip catalyst device of example 1, comprising: a bypass pipe comprising the inactive region, the bypass pipe being separated from the active region.

Example 9: The ammonia slip catalyst device of example 8, wherein the bypass pipe and the active region are eccentric.

Example 10: An exhaust aftertreatment system for a vehicle comprising: a catalytic reduction device, at least one urea injector upstream of the catalytic reduction device, and an ammonia slip catalyst device according to anyone of the preceding examples.

Example 11: The exhaust aftertreatment system according to example 10, further comprising: a sensor arranged at an outlet of the ammonia slip catalyst device, the sensor being configured to measure a level of ammonia in the exhaust gas at the outlet of the ammonia slip catalyst device; and a processing circuitry configured to: calculate the levels of ammonia in the exhaust gas at the inlet of the ammonia slip catalyst device based on the measured levels of ammonia and on the ratio of coated area in the active-region and non-coated area in the inactive region of the ammonia slip catalyst device, and control the urea injector to adjust an amount of urea based on the calculated levels of ammonia in the exhaust gas at the inlet of the ammonia slip catalyst device to reduce the amount of urea at the inlet of the ammonia slip catalyst device.

Example 12: The exhaust aftertreatment system according to example 10, comprising: a sensor arranged at an outlet of the inactive region of the ammonia slip catalyst device, the sensor being configured to measure a level of ammonia in the exhaust gas at the outlet of the inactive region of the ammonia slip catalyst device; and a processing circuitry configured to: determine the levels of ammonia in the exhaust gas at the inlet of the ammonia slip catalyst device based on the measured levels of ammonia, and control the urea injector to adjust an amount of urea based on the determined levels of ammonia in the exhaust gas at the inlet of the ammonia slip catalyst device to reduce the amount of urea at the inlet of the ammonia slip catalyst device.

Example 13: A vehicle comprising the ammonia slip catalyst device according to any of examples 1-9 and/or the exhaust aftertreatment system according to any one of examples 10-12.

Example 14: A method for controlling the amount of urea or ammonia injected into an engine exhaust gas flow upstream of a catalytic reduction device (SCR), comprising: measuring an amount of ammonia at an outlet of an ammonia slip catalyst device arranged downstream of the catalytic reduction device to receive exhaust gas from the catalytic reduction device, the ammonia slip catalyst device comprises an active region having an inlet and an outlet and comprising a catalyst coating that is configured to reduce an amount of ammonia in received exhaust gas by oxidation, and the inactive region having an inlet and an outlet, the inactive regions being without catalyst coating, whereby the inactive region is configured to allow ammonia in the received exhaust gas to pass, determining (S104) the levels of ammonia in the exhaust gas at the inlet of the ammonia slip catalyst device based on the measured levels of ammonia, controlling (S106) a urea injector to adjust an amount of urea or ammonia upstream of the catalytic reduction device based on the calculated levels of ammonia in the exhaust gas at the inlet of the ammonia slip catalyst device to reduce the amount of urea at the inlet of the ammonia slip catalyst device.

Example 15: The method of example 14, wherein the sensor is arranged to measure a combined amount of ammonia at an outlet of the inactive region and the active region, determining the levels of ammonia in the exhaust gas at the inlet of the ammonia slip catalyst device is based on the measured levels of ammonia, and on the ratio of coated area in the active-region and non-coated area in the inactive region of the ammonia slip catalyst device.

Example 16: The method of example 14, wherein the sensor is arranged to measure the amount of ammonia at the outlet of the inactive region, determining the levels of ammonia in the exhaust gas at the inlet of the ammonia slip catalyst device is based on the measured levels of ammonia.

Example 17: The method of any one of examples 14-16, the inactive region being in a bypass pipe being separated from the active region.

Example 18: The method of any one of examples 14-16, wherein the inactive region is surrounded by the active region.

Example 19: The method of any of examples 13-18, performed on-board a vehicle.

Example 20: A processing circuitry configured to execute the steps of any one of examples 13-19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An exhaust aftertreatment system for a vehicle comprising:

a catalytic reduction device;

at least one urea injector upstream of the catalytic reduction device; and an ammonia slip catalyst device, the ammonia slip catalyst device comprising:

an inlet for receiving exhaust gas from the catalytic reduction device, and an outlet for directing outlet gas towards an exhaust outlet of the exhaust aftertreatment system, a flow direction of the ammonia slip catalyst device being from the inlet to the outlet;

an active region having an inlet and an outlet, the active region comprising a catalyst coating that is configured to reduce an amount of ammonia in the received exhaust gas by oxidation; and an inactive region having an inlet and an outlet, the inactive region being without catalyst coating, whereby the inactive region is configured to allow ammonia in the received exhaust gas to pass through the ammonia slip catalyst device without ammonia oxidation such that the concentration of ammonia in the exhaust gas at the outlet of the inactive region is substantially the same as the inlet of the ammonia slip catalyst device;

the exhaust aftertreatment system further comprising:

a sensor arranged at the outlet of the ammonia slip catalyst device, the sensor being configured to measure a level of ammonia in the exhaust gas at the outlet of the ammonia slip catalyst device; and processing circuitry configured to:

calculate the levels of ammonia in the exhaust gas at the inlet of the ammonia slip catalyst device based on the measured levels of ammonia and on a ratio of coated area in the active-region and non-coated area in the inactive region of the ammonia slip catalyst device; and control the urea injector to adjust an amount of urea or ammonia upstream of the catalytic reduction device based on the calculated levels of ammonia in the exhaust gas at the inlet of the ammonia slip catalyst device to reduce the amount of urea or ammonia at the inlet of the ammonia slip catalyst device.

2. The exhaust aftertreatment system of claim 1, wherein the inactive region is surrounded by the active region.

3. The exhaust aftertreatment system of claim 2, wherein the inlets of the active region and the inactive region are sub-portions of the inlet of the ammonia slip catalyst device.

4. The exhaust aftertreatment system of claim 2, wherein the outlets of the active region and the inactive region are sub-portions of the outlet of the ammonia slip catalyst device.

5. The exhaust aftertreatment system of claim 1, wherein the inactive region and the active region are concentric.

6. The exhaust aftertreatment system of claim 1, wherein the area of non-coated surfaces in the inactive region is less than 5% of the total area of surfaces in the active and inactive regions.

7. The exhaust aftertreatment system of claim 1, comprising:

a bypass pipe comprising the inactive region, the bypass pipe being separated from the active region.

8. The exhaust aftertreatment system of claim 7, wherein the bypass pipe and the active region are eccentric.

9. The exhaust aftertreatment system of claim 1, the sensor being arranged at an outlet of the inactive region of the ammonia slip catalyst device, the sensor being configured to measure a level of ammonia in the exhaust gas at the outlet of the inactive region of the ammonia slip catalyst device; and the processing circuitry being configured to:

determine the levels of ammonia in the exhaust gas at the inlet of the ammonia slip catalyst device based on the measured levels of ammonia; and control the urea injector to adjust the amount of urea or ammonia based on the determined levels of ammonia in the exhaust gas at the inlet of the ammonia slip catalyst device to reduce the amount of urea or ammonia at the inlet of the ammonia slip catalyst device.

10. A vehicle comprising the exhaust aftertreatment system of claim 1.

11. A method for controlling the amount of urea or ammonia injected into an engine exhaust gas flow upstream of a catalytic reduction device (SCR), comprising:

measuring an amount of ammonia at an outlet of an ammonia slip catalyst device arranged downstream of the catalytic reduction device to receive exhaust gas from the catalytic reduction device, the ammonia slip catalyst device comprises an active region having an inlet and an outlet and comprising a catalyst coating that is configured to reduce an amount of ammonia in received exhaust gas by oxidation, and the inactive region having an inlet and an outlet, the inactive regions being without catalyst coating, whereby the inactive region is configured to allow ammonia in the received exhaust gas to pass through the ammonia slip catalyst device without ammonia oxidation such that the concentration of ammonia in the exhaust gas at the outlet of the inactive region is substantially the same as the inlet of the ammonia slip catalyst device;

determining the levels of ammonia in the exhaust gas at the inlet of the ammonia slip catalyst device based on the measured levels of ammonia and on a ratio of coated area in the active-region and non-coated area in the inactive region of the ammonia slip catalyst device; and controlling a urea injector to adjust an amount of urea or ammonia upstream of the catalytic reduction device based on the calculated levels of ammonia in the exhaust gas at the inlet of the ammonia slip catalyst device to reduce the amount of urea or ammonia at the inlet of the ammonia slip catalyst device.

12. The method of claim 11, wherein the sensor is arranged to measure the amount of ammonia at the outlet of the inactive region, determining the levels of ammonia in the exhaust gas at the inlet of the ammonia slip catalyst device is based on the measured levels of ammonia.

13. The method of claim 11, the inactive region being in a bypass pipe being separated from the active region.

14. The method of claim 11, wherein the inactive region is surrounded by the active region.

15. The method of claim 11, performed on-board a vehicle.

16. A processing circuitry configured to execute the steps of claim 11.

* * * * *